No. 687,995.  
R. E. JOSEPH.  
LISTER CULTIVATOR.  
(Application filed Apr. 5, 1901.)

Patented Dec. 3, 1901.

(No Model.)

2 Sheets—Sheet 1.

Witnesses  
Wallace G. Power  
I. R. Boyer

Inventor  
R. E. Joseph  
by J. S. Brown  
Attorney

No. 687,995. Patented Dec. 3, 1901.
R. E. JOSEPH.
LISTER CULTIVATOR.
(Application filed Apr. 5, 1901.)
(No Model.) 2 Sheets—Sheet 2.
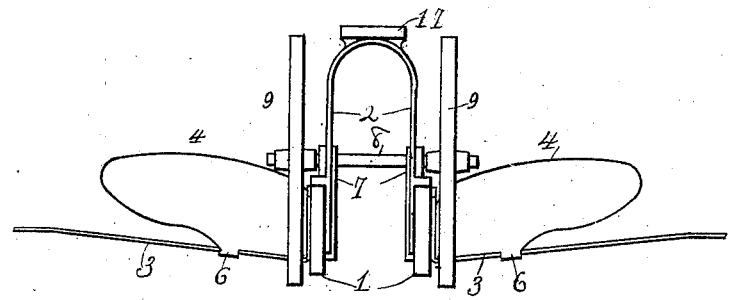
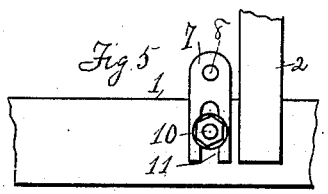
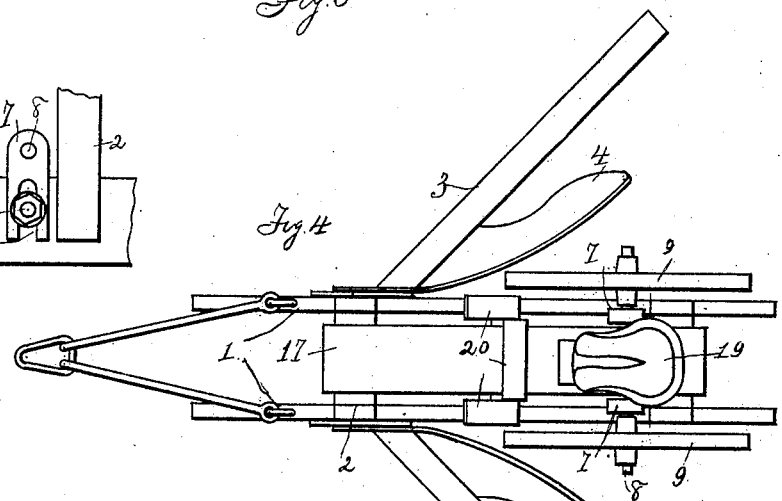
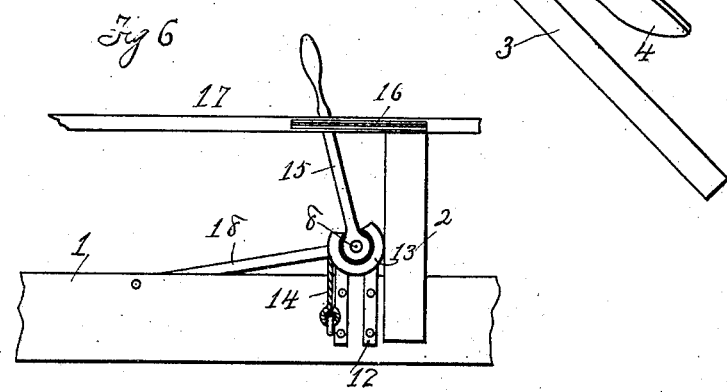
Witnesses
Wallace G. Tower
J. R. Boyer
Inventor
R. E. Joseph
by T. S. Brown
Attorney

UNITED STATES PATENT OFFICE.

RUFUS E. JOSEPH, OF POTWIN, KANSAS.

LISTER-CULTIVATOR.

SPECIFICATION forming part of Letters Patent No. 687,995, dated December 3, 1901.

Application filed April 5, 1901. Serial No. 54,515. (No model.)

*To all whom it may concern:*

Be it known that I, RUFUS E. JOSEPH, a citizen of the United States, residing at Potwin, in the county of Butler, in the State of Kansas, have invented certain new and useful Improvements in Lister-Cultivators, of which the following is a full, clear, and exact description, reference being had to the accompanying drawings, which form a part of this specification.

My invention relates to improvements in lister-cultivators; and my invention consists in certain features of novelty hereinafter described, and pointed out in the claims.

Figure 1:
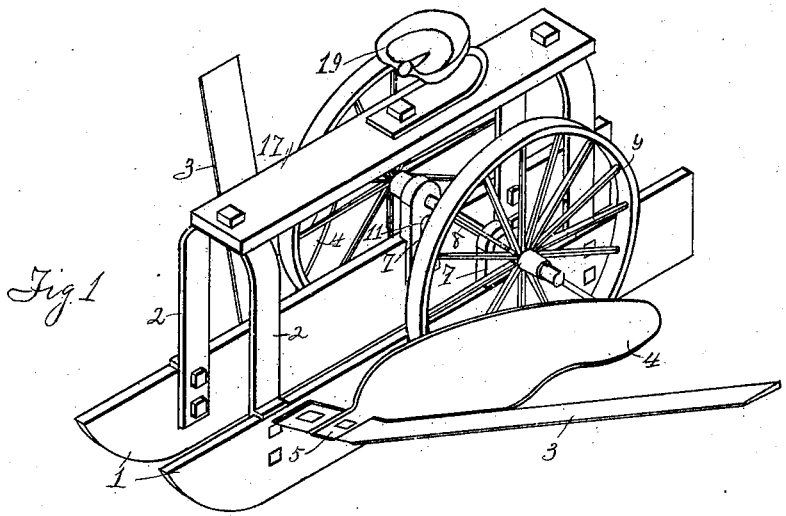
Figure 2:
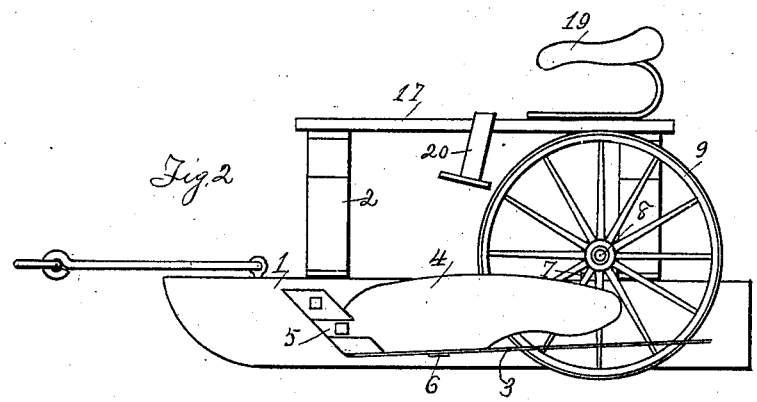

Figure 1 represents an isometric view of a lister-cultivator embodying my invention. Fig. 2 represents a side elevation of the same. Fig. 3 represents a rear end elevation of the same. Fig. 4 represents a plan view of the same. Fig. 5 represents a detail view showing certain means by which the runners may be adjustably connected with the axle of the truck. Fig. 6 represents a detail view showing another means by which the runners are adjustably connected with the axle of the truck and in which such adjustment may be made and the rear end of the runner raised or lowered by the operator when the machine is in motion and without stopping the team to make the same.

Similar numerals refer to similar parts throughout the several views.

1 represents a pair of runners separated such distance apart as to travel conveniently in the listed furrow, astraddle of the row of plants growing therein, and held together and retained in vertical position by the arches 2. Upon said runners, toward the forward end thereof, are mounted the long thin blades 3, extending laterally and rearwardly therefrom at a slight upward angle from the horizontal plane and adapted to make a shallow cut under the soil along the side of the lister-ridge on either side of the row of plants, cutting off the weed-roots and stirring up and mellowing the soil. Long moldboards 4 are mounted immediately adjacent to the rear edge of said blades, connected to the runners by the tongues 5, and extending a distance along the rear edge of said blades, as shown, are connected therewith by the tongues 6. Said moldboards are adapted to turn the soil cut up and loosened by the inner part of the blades next to the runners and cast it over the weeds cut off by the blades, covering up and effecting the complete extermination of the weeds and weed-seed, which would otherwise continue to grow, and thus leaving the soil in a mellow and clean condition. Toward the rear end of said runners are adjustably mounted standards 7, in which is journaled the axle 8 of a truck having wheels 9. Said standards may be adjustably connected with the runners, as shown in Fig. 5, by a bolt 10, passing through the runner and engaging a slot 11 in said standards, a nut and washer being provided to secure the standard in place, as shown; or such adjustability may be effected, as shown in Fig. 7, by stirrups 12, mounted upon the runners and engaging the axle, and the runner raised and lowered by a cam 13, mounted on the axle and connected with the runners by a cable 14, an upwardly-extending hand-lever 15 being connected to the cam and arranged to engage and be retained by a notched bar 16 on the seat-board 17, mounted upon the arches 2. By such arrangement the weight of the rear end of the runners is carried upon the truck, and by such adjustment by raising and lowering the rear end of the runners the runners are tilted and the depth of the cut of the blades into the soil is regulated.

Draw-bars 18, connected with the axle and extending and connected with the runners, should be provided to give stability to the structure.

A seat 19 and a foot-rest 20 may be mounted upon the seat-board 17 if it is desired to provide a riding-cultivator.

Among the principal advantages obtained by the construction and arrangement constituting my invention are, first, in providing the long moldboards adjacent to the runners and the blades, whereby the soil is turned and thrown over the weeds cut off by the runners and the crop of weeds exterminated and the soil left in a finely-pulverized condition and clean; second, by the adjustment of the rear of the runners with reference to the axle of the truck the runners are tilted and the depth of the cut of the blades in the soil is regulated.

The importance of these advantages will be readily apparent to any one acquainted with the conditions prevalent at the first tillage of a listed crop after the plants have come through the ground sufficiently to cultivate.

Having thus fully described my improvement, what I claim as my invention, and desire to secure by Letters Patent, is—

1. In a lister-cultivator the combination of the connected runners arranged to run in the list-furrow, the laterally-extending blades mounted upon the runners, and the moldboards arranged immediately adjacent to the rear of the blades connected with the runners and with the blades substantially as set forth.

2. In a lister-cultivator, the combination substantially as described, of the connected runners arranged to run in the list-furrow, the laterally, rearwardly, and upwardly extending blades mounted upon the runners, and moldboards mounted on the runners to the rear of the blades and arranged to turn the soil over the weeds cut off by the blades.

3. In a lister-cultivator, the combination substantially as described of a truck, and connected runners arranged to travel in the list-furrow and adjustably connected with the axle of said truck whereby said runners may be tilted by raising or lowering one end thereof.

4. In a lister-cultivator, the combination substantially as described, of a truck, connected runners provided with laterally-extending blades, and arranged to travel in the list-furrow, and adjustable connection between said runners and the axle of said truck whereby said runners may be tilted by raising or lowering one end thereof to control the depth of cut of said blades in the soil.

5. In a lister-cultivator, the combination substantially as described of connected runners arranged to travel in the list-furrow, laterally-extending blades mounted on said runners toward the forward ends thereof, moldboards mounted on the runners to the rear of said blades and arranged to turn the soil over the weeds cut off by said blades, a truck mounted over said runners toward the rear thereof, and adjustable connection between said runners and the axle of said truck whereby said runners may be tilted to control the depth of cut of said blades in the soil.

RUFUS E. JOSEPH.

Witnesses:
L. D. WILLIAMS,
H. A. DOYLE.